No. 751,432. PATENTED FEB. 2, 1904.
B. W. HOPPER.
SHOE FASTENING DEVICE.
APPLICATION FILED MAY 28, 1902.
NO MODEL. 5 SHEETS—SHEET 1.

WITNESSES
INVENTOR
Bernard W. Hopper

No. 751,432. PATENTED FEB. 2, 1904.
B. W. HOPPER.
SHOE FASTENING DEVICE.
APPLICATION FILED MAY 28, 1902.
NO MODEL. 5 SHEETS—SHEET 2.

WITNESSES
B. S. Alexander.
Andrew Wright Crawford.

INVENTOR
Bernard W. Hopper
by H. Bovee Schermerhorn
Attorney

No. 751,432. PATENTED FEB. 2, 1904.
B. W. HOPPER.
SHOE FASTENING DEVICE.
APPLICATION FILED MAY 28, 1902.
NO MODEL. 5 SHEETS—SHEET 3.

WITNESSES
B. S. Alexander
Andrew Wright Crawford

INVENTOR
Bernard W. Hopper
by H. Bovee Ochsenreuther
Attorney

No. 751,432. PATENTED FEB. 2, 1904.
B. W. HOPPER.
SHOE FASTENING DEVICE.
APPLICATION FILED MAY 28, 1902.
NO MODEL. 5 SHEETS—SHEET 4.

WITNESSES
E. S. Alexander
Andrew Wright Crawford

INVENTOR
Bernard W. Hopper
by
H. Bovee Schermerhorn
Attorney

No. 751,432. PATENTED FEB. 2, 1904.
B. W. HOPPER.
SHOE FASTENING DEVICE.
APPLICATION FILED MAY 28, 1902.
NO MODEL. 5 SHEETS—SHEET 5.

Witnesses:

Inventor:

No. 751,432. Patented February 2, 1904.

UNITED STATES PATENT OFFICE.

BERNARD W. HOPPER, OF PHILADELPHIA, PENNSYLVANIA.

SHOE-FASTENING DEVICE.

SPECIFICATION forming part of Letters Patent No. 751,432, dated February 2, 1904.

Application filed May 28, 1902. Serial No. 109,395. (No model.)

*To all whom it may concern:*

Be it known that I, BERNARD W. HOPPER, a citizen of the United States, residing at No. 1747 North Sixteenth street, in the city of Philadelphia, State of Pennsylvania, have invented a new and useful Shoe-Fastening Device or Mechanical Appliance, of which the following is a specification.

My invention relates to improvements in shoe-fastenings; and it consists of a device for fastening shoes to the human foot in substitution for laces, shoe-buttons, or other devices now used for that purpose.

Figure 1:
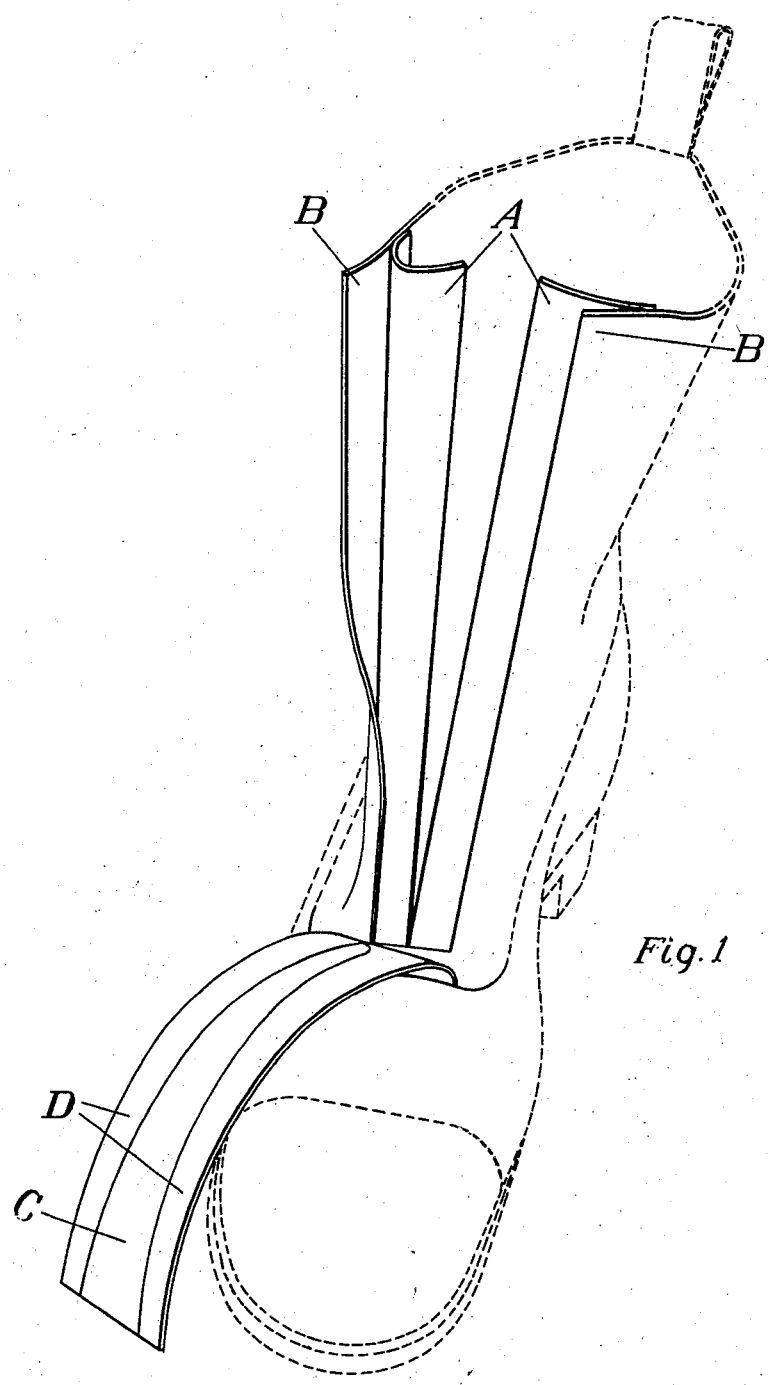
Figures 2, 3, 4, 5:
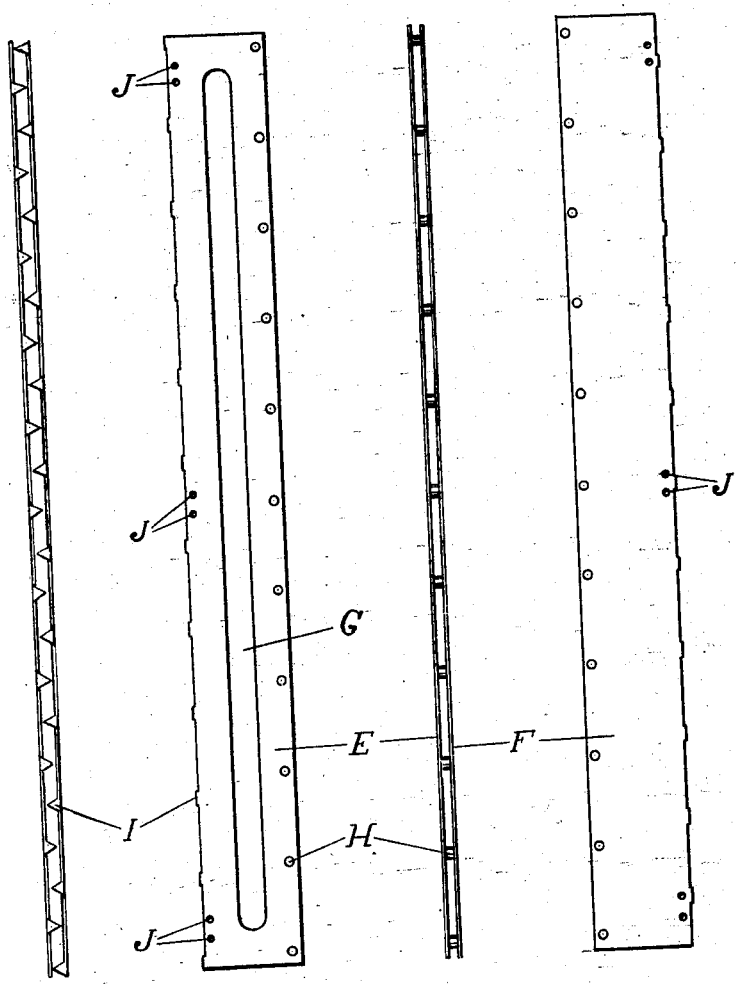
Figure 6:
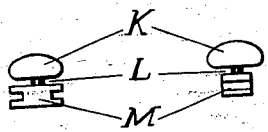
Figure 8:
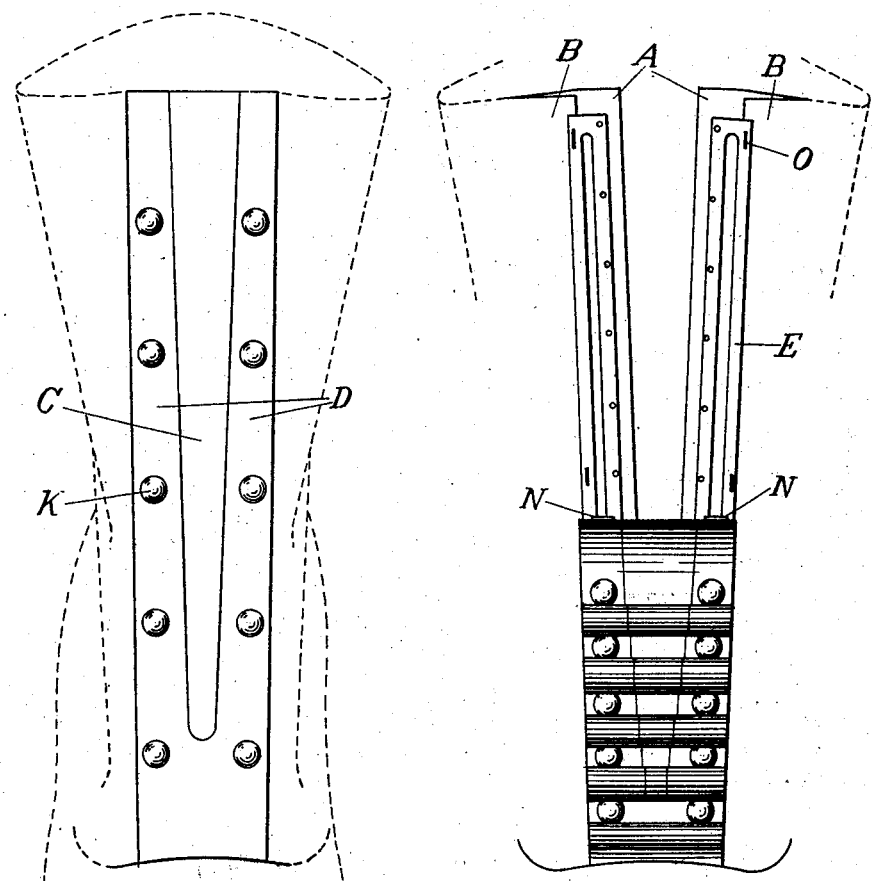
Figure 9:
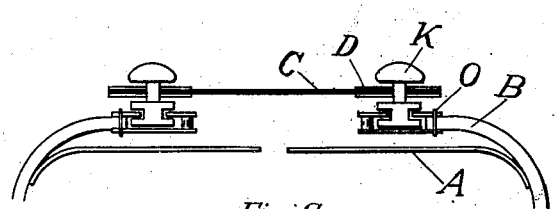
Figure 7:
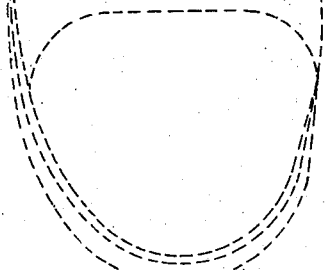
Figure 10:
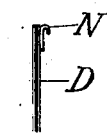
Figure 11:
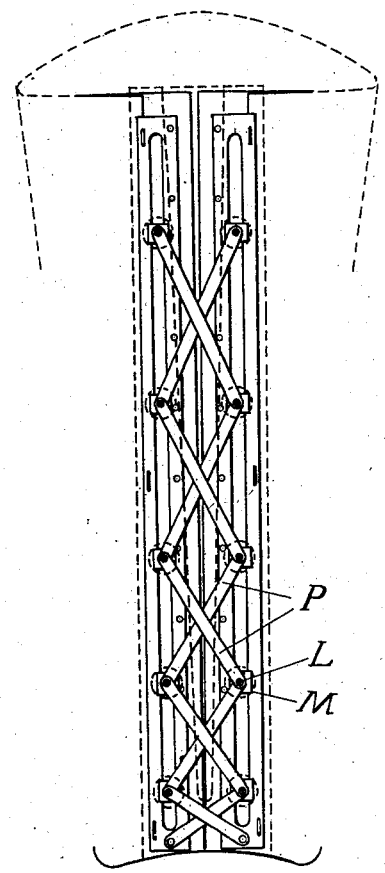
Figure 12:
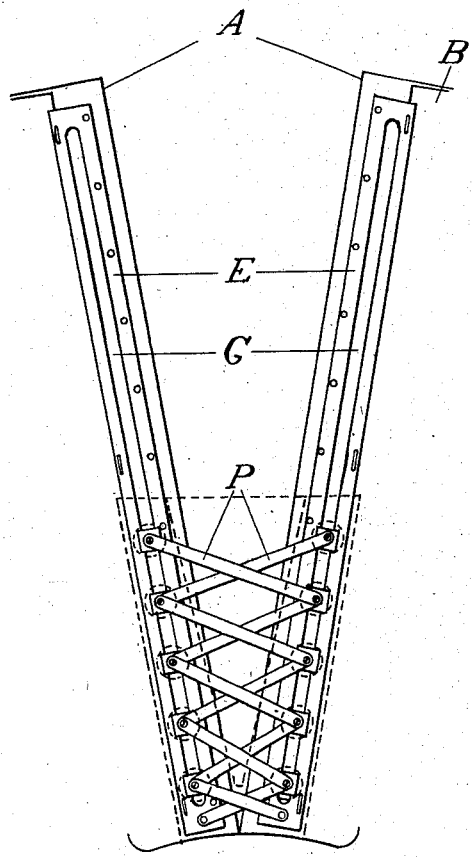
Figure 13:
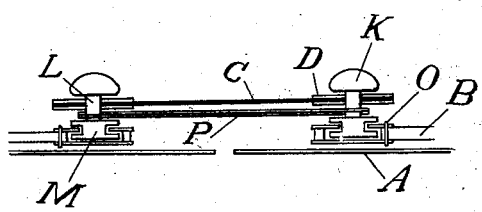
Figure 14:
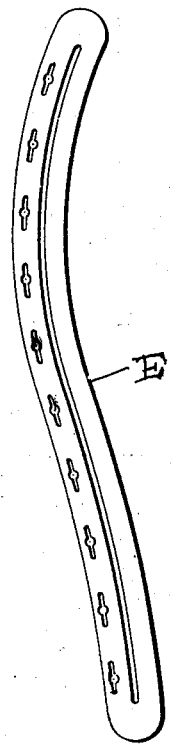
Figure 15:
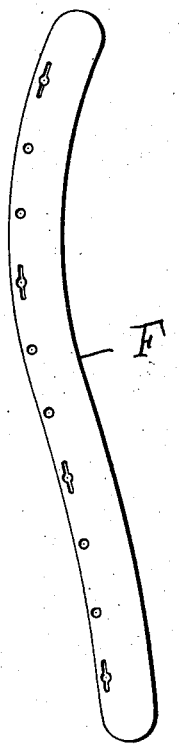
Figure 16:
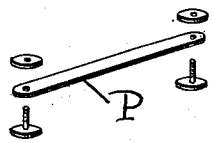

In the accompanying drawings, Figure 1 is a view of a shoe with its upper and tongue prepared for my fastening device. Figs. 2 and 4 are the outer and inner strips before joining. Fig. 3 is a view of the corresponding edges along one side of said outer and inner strips, showing the manner in which they are connected. Fig. 5 is a view of the corresponding edges along the other side of said outer and inner strips, showing the means whereby the joined strips are fastened to the shoe. Fig. 6 is a side and end view of the stud, which is attached to the tongue of the shoe, showing the means whereby said stud is slidably attached to the outer strip shown in Fig. 2. Fig. 7 is a view of the shoe-tongue and studs therein. Fig. 8 is a view of the outer and inner strips connected and attached to the shoe, with the shoe-tongue mounted thereon and drawn down. Fig. 9 is a sectional view showing the shoe-tongue slidably attached by its studs to the outer strip and omitting the diagonal braces shown in Fig. 13. Fig. 10 is a sectional view of the top of the shoe-tongue, showing the means whereby it may be attached to the top of the outer strip. Fig. 11 is a view showing the diagonal braces connecting the studs, the tongue covering said braces being removed. Fig. 12 is a view of the same, showing the method of opening the shoe by pushing down the diagonal braces. Fig. 13 is a sectional view identical with Fig. 9, with the addition of the diagonal braces. Figs. 14 and 15 show an alternative form of the outer and inner strips, being slightly curved instead of straight. Fig. 16 is a view of one of the diagonal braces.

In Figs. 2 and 4, E and F are strips of thin flexible metal or other suitable material rigidly connected along one side by the rivets H in such manner as to leave a slight space between the outer and inner strips, as shown in Fig. 3. These strips E and F may be straight or may be slightly curved, as shown in Figs. 14 and 15. The unconnected sides of said strips may be furnished with the teeth 1, (shown in Fig. 5,) adapted to clasp one pair of the joined strips firmly to the edges of the uppers along each side of the shoe from top to bottom of the shoe-opening, as shown in Fig. 8. If desired, the outer and inner strips E and F may be further attached to the uppers by the clasps O, Figs. 8 and 9, passing through the holes J, (shown in Figs. 2 and 4,) or said outer and inner strips may be attached to the quarter-leather by sewing through the keyhole-slots. (Shown in Figs. 14 and 15.) The mode in which the outer and inner strips may be attached to the uppers is immaterial. Any suitable method other than those indicated may be employed.

In Figs. 14 and 15 the strips E and F are shown with a slight curvature. The quarter-leather of most shoes is not cut on a straight line along the meeting edges, but has a slight curve at the instep. This is in reality unnecessary, and consequently I prefer to use a straight-edged quarter-leather and straight strips therefor; but in order to show that my invention may be adapted to the curved quarter-leathers I have shown a form of strip that may be applied thereto.

The shanks L of the studs K are connected by a plurality of diagonal braces P, in the ends of which the shanks L are adapted to rotate freely in such manner that the diagonal braces and their studs can be raised and lowered upon the slotted strips E, as shown in Figs. 11 and 12, in the operation of opening and closing the shoe.

The lowest pair of braces, at the point of union between the vamp and the quarter-leather, have their lowermost ends swiveled to the slotted strip E.

Beginning with the lowest pair of braces and ascending toward the top of the shoe, each successive pair of braces has a slightlyincreased length beyond the preceding pair in order to admit of a more complete opening in putting on the shoe.

To the top of the shoe-tongue is attached a pair of hooks or catches N, Fig. 10, adapted to engage the top of the outer strips E when the tongue is drawn up, and thereby to hold said tongue from slipping down.

The tongue C D is composed of two parts, the V-shaped piece D, Fig. 7, being of leather, cloth, or other like suitable material formed in two parts—an inner and an outer part—inclosing the central piece C along its edges, as shown in the sectional views of Figs. 9 and 13, the central piece C being of any suitable elastic material which will admit of the tongue being stretched laterally when drawn down to open the shoe, as shown in Fig. 12.

The uppers B are provided from top to bottom of the shoe-opening with the inner flaps A. (Shown in Fig. 1.) The function of these inner flaps is to protect the instep and front of the foot from any contact with the more or less unyielding surfaces or edges of the guiding-strips upon which the tongue is mounted. Since I prefer that these guiding-strips be composed of metal, it is important that the play of the foot in the act of walking be shielded from contact therewith.

The mode of operation of my shoe-fastening device is apparent from the foregoing description. In Fig. 8 the shoe-tongue is drawn down to open the shoe. It will be observed that the shoe-tongue, not being attached to the outer strips E otherwise than by the studs K, is free to buckle, as shown in Fig. 8, thus allowing the tongue to be pushed down far enough to sufficiently open the shoe. In Fig. 7 the tongue is shown fully drawn up and fastened.

What I claim as my invention, and desire to secure by Letters Patent, is—

1. In combination in a shoe-fastening device, a pair of guiding-strips, each member of said pair comprising a slotted outer strip and a solid inner strip joined thereto by the connecting members H, said outer and inner strips being arranged parallel each to each and slightly separated, a tongue having an elastic center C and a non-elastic lateral reinforcement D mounted and adapted to be raised and lowered upon said guiding-strips, by means of the studs K, and the inner flaps A adapted to protect the foot from contact with said guiding-strips, substantially as described.

2. In combination in a shoe-fastening device, a pair of guiding-strips, each member of said pair comprising a slotted outer strip and a solid inner strip joined thereto, said outer and inner strips being parallel with and slightly separated from each other, a tongue having the elastic center C and the non-elastic lateral reinforcement D mounted and adapted to be raised and lowered upon said guiding-strips by means of the studs K, a series of diagonal braces P movably connected to said studs, and the inner flaps A interposed between the foot and said guiding-strips and diagonal braces, substantially as described.

3. In combination in a shoe-fastening device, a pair of guiding-strips, each member of said pair comprising a slotted outer strip and solid inner strip joined thereto, said outer and inner strips being parallel with and slightly separated from one another, a tongue adapted to be raised and lowered upon said guiding-strips by means of the studs K, and the inner flaps A adapted to protect the foot from contact with said guiding-strips, substantially as described.

In testimony whereof I have this 29th day of March, A. D. 1902, signed my name to this specification in the presence of two subscribing witnesses.

BERNARD W. HOPPER.

Witnesses:
JOSEPH W. BURNS,
LEO MACFARLAND.